Jan. 17, 1928.

1,656,880

F. N. MASON

ROD PACKING

Filed Sept. 16, 1926

INVENTOR
Frank N. Mason,
by F. N. Barber,
attorney.

Patented Jan. 17, 1928.

1,656,880

UNITED STATES PATENT OFFICE.

FRANK N. MASON, OF SOUTH BROWNSVILLE, PENNSYLVANIA, ASSIGNOR TO W. P. JOHN, OF SOUTH BROWNSVILLE, PENNSYLVANIA.

ROD PACKING.

Application filed September 16, 1926. Serial No. 135,786.

My invention relates to packing for piston rods, valve stems and the like, and its object is to provide composite packing rings which will ensure fluid-tight joints under all conditions. This and other objects will be made clear in the following description.

Figure 1:
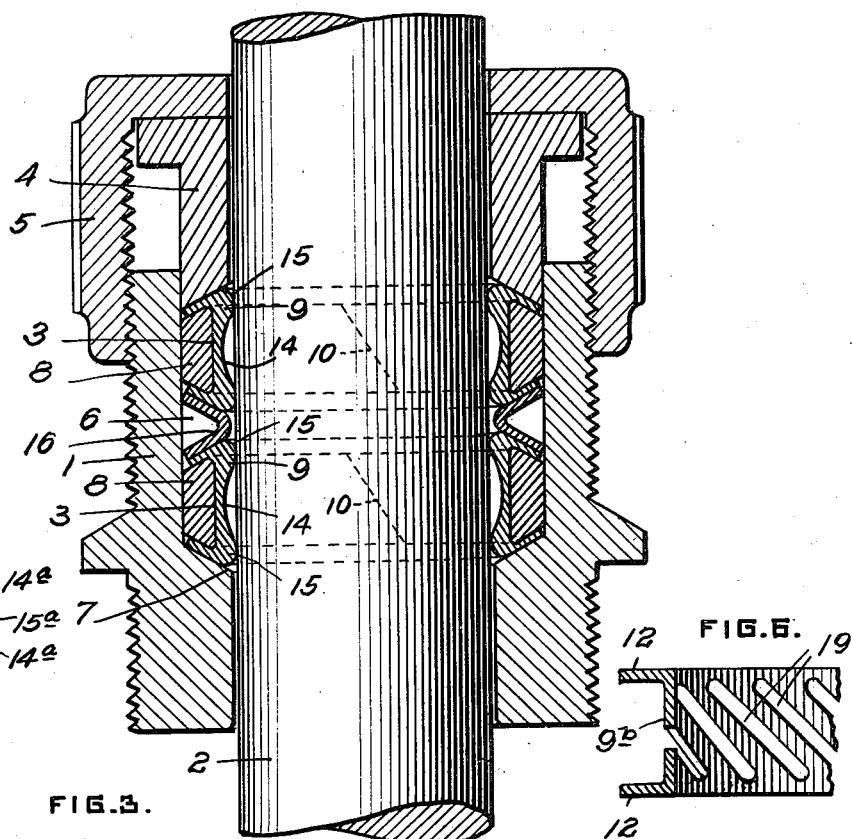
Figure 3:
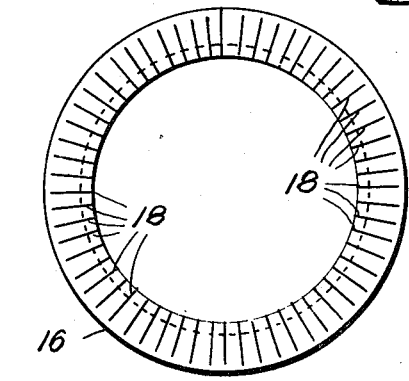
Figure 2:
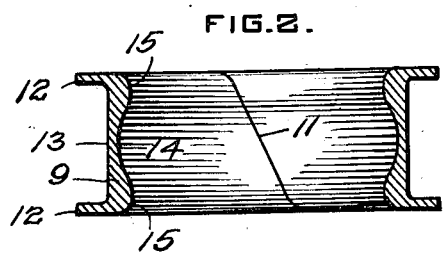
Figure 4:
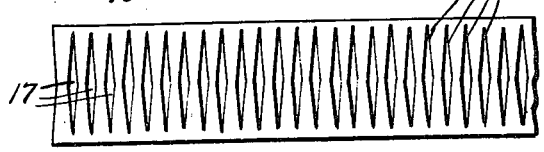

Referring to the accompanying drawing, Fig. 1 is a central longitudinal section of a stuffing-box embodying my invention, the rod 2 being in side elevation and broken off at both ends; Fig. 2, a central longitudinal cross-section of one of the metal elements of my packing rings before assembly with its companion asbestos ring; Fig. 3, a plan view of the elastic metal spacing ring; Fig. 4 a side view of a portion of the spacing ring straightened out or developed; Fig. 5, a section showing the cross-sectional shape of a modification of the ring, and Fig. 6, a section showing the cross-sectional shape of another modification of the said ring.

On the drawing, 1 designates the stuffing-box casing containing the reciprocable rod 2, surrounded by the composite packing rings 3, the gland 4, and the cap 5, the latter being threaded to screw in the casing. The bottom of the casing preferably fits the rod closely. Above this closely-fitting portion of the stuffing-box casing is an annular chamber 6 having its bottom wall preferably tapered downwardly toward the rod 2 to form an inclined seat or shoulder 7 for the correspondingly inclined edge of the lowest packing ring 3. Preferably a plurality of packing rings 3 are superimposed on the seat 7 in the chamber 6, on the uppermost of which rings is seated the gland 4, preferably having its lower or inner end beveled upwardly and toward the rod 2, so as to fit the beveled upper end of the upper ring 3. The inner face of the cap 5 engages the top of the gland and, as it is screwed down, causes the gland to compress the packing rings in the chamber 6 which is bounded by the inner wall of the stuffing-box casing, the rod 2, the gland 4 and the shoulder 7.

The packing rings 3 are composite and are each composed preferably of a ring of graphited asbestos having its inner wall seated in an outwardly-facing channel in a metal ring 9 which bears directly on the rod 2. Each ring 8 is divided or cut entirely through diagonally at least at one place as shown at 10 in Fig. 1, and the ring 9 is cut entirely through at least at one place as shown at 11.

Before assembling a ring 8 with a ring 9, the flanges 12 of the ring 9 are preferably at right angles to the intermediate portion 13 thereof. The divided flexible ring 8 can be easily inserted in the channel formed by the flanges 12 and the portion 13. The assembled rings 8 and 9 are placed in a press having their opposing pressing faces constructed to depress the flanges 12 into the sides of the ring 8, in order that the flanges may form with the portion 13 a locking groove to retain the rings in their assembly. Both edges of the assembled rings 3 are preferably inclined to correspond to the inclines on the shoulder 7 and gland 4.

The inner or annular portion 13 of the ring 9 has an annular groove 14 facing the rod 2 and lying centrally of the portion 13, but the outer face of the portion 13 is straight from one flange 12 to the other. This provides thickened annular ribs 15 opposite the flanges 12 and a relatively thin annular portion at the deepest part of the groove 14, whereby the pressure applied to the gland will flex the metal of the groove 14.

By making the portion 13 thick at its edges and thin at its center, I provide a ring which will wear much longer than it would if the portion 13 were of uniform thickness. At the same time I provide for the flexing of the ring 9 at the center of the portion 13 without producing distortion of the ribs 15. This is an important matter since distortion of the ribs 15 would cause fluid leaking past them.

The rings 9 are preferably made of copper.

As the rings 3 wear they become slightly loose in the chamber 6. This looseness may be taken up by turning the cap 5 from time to time. However, it is advisable to provide a constantly working means to take up the looseness as it develops. This means I show in the form of an elastic ring 16 of spring bronze, brass or steel. It is made from a strip of metal bent along its longitudinal center line so that its cross-section is V-shaped. Previous to this bending operation diamond-shaped transverse holes or slots 17 are cut in the strip, as shown in Fig. 4. When the slotted ring 16 has been bent to V-shape, as described, it is then bent into circular form as shown in Fig. 3, the slots being preferably shaped so that when the ring 16 is formed their sides are parallel or their opposite sides come substantially together as shown at 18 in Fig. 3. The inclines on the ring 16 correspond to those on the rings 9. When the gland has compressed the rings 3 and 16, the latter through its resilient sides constantly exerts pressure on the rings 3, whereby the latter are held fixedly in the chamber 6 and are compressed longitudinally as they wear at the ribs 15. This compression of the rings 3 causes them to maintain a tight fit against the rod 2.

The constant tendency of the outwardly flaring sides of the resilient ring 16 to increase the angle between the sides has two resultants, one parallel with the rod 2 and the other radial thereof. The first resultant compresses the packing in a direction parallel with the rod and causes it to expand radially and thereby keep it in close contact with the rod as the packing wears or the packing itself becomes denser. The first resultant also keeps the packing rings tight against the ring 16, the shoulder 7 and the gland 4, and at the same time puts a pressure on the cap 5 which tends to keep it from accidentally unscrewing. The second resultant acts radially toward the rod 2. It acts as if a separate force were pushing the packing rings constantly directly against the shaft.

In Fig. 5, the ring 9$^a$ has a central rib 15$^a$ with two grooves 14$^a$, and in Fig. 6 the ring 9$^b$ is without a groove in its intermediate portion, but it has diagonal slots 19 to cause the said portion to flex more readily under pressure without distortion of the portions opposite the flanges 12.

I claim—

1. The combination of a reciprocable rod, a stuffing box surrounding the rod, a plurality of alined flexible metal rings between the stuffing box and the rod, each ring comprising a metal channel with its back against the rod and its flanges projecting outwardly and converging toward each other, a ring of yielding packing material fitting each channel, a resilient metal ring, V-shaped in cross-section seated between adjacent metal rings and having its vertex next to the rod and its flaring sides bearing against the edges of adjacent metal rings, and a gland surrounding the rod and exerting pressure on the outermost metal ring, the surfaces of the stuffing box and the gland which engage the ends of the innermost and the outermost metal rings being beveled to correspond to the ends of the adjacent metal rings.

2. The combination of a reciprocable rod, a stuffing box surrounding the rod, a plurality of alined flexible metal rings between the stuffing box and the rod, each ring comprising a metal channel with its back against the rod and its flanges projecting outwardly and converging toward each other, a ring of yielding packing material fitting each channel, a resilient metal ring, V-shaped in cross-section seated between adjacent metal rings and having its vertex next to the rod and its flaring sides bearing against the edges of adjacent metal rings, and a gland surrounding the rod and exerting pressure on the outermost metal ring.

3. A packing including two compressible packing-rings strung on a reciprocable rod, and a resilient ring adapted to be seated between consecutive packing rings and to exert constant pressure against each of the rings when the packing is under compression, the resilient ring being composed of spring material V-shaped in cross-section, and its vertex being next to the rod.

In testimony whereof, I hereunto affix my signature.

FRANK N. MASON.